Figure 1:
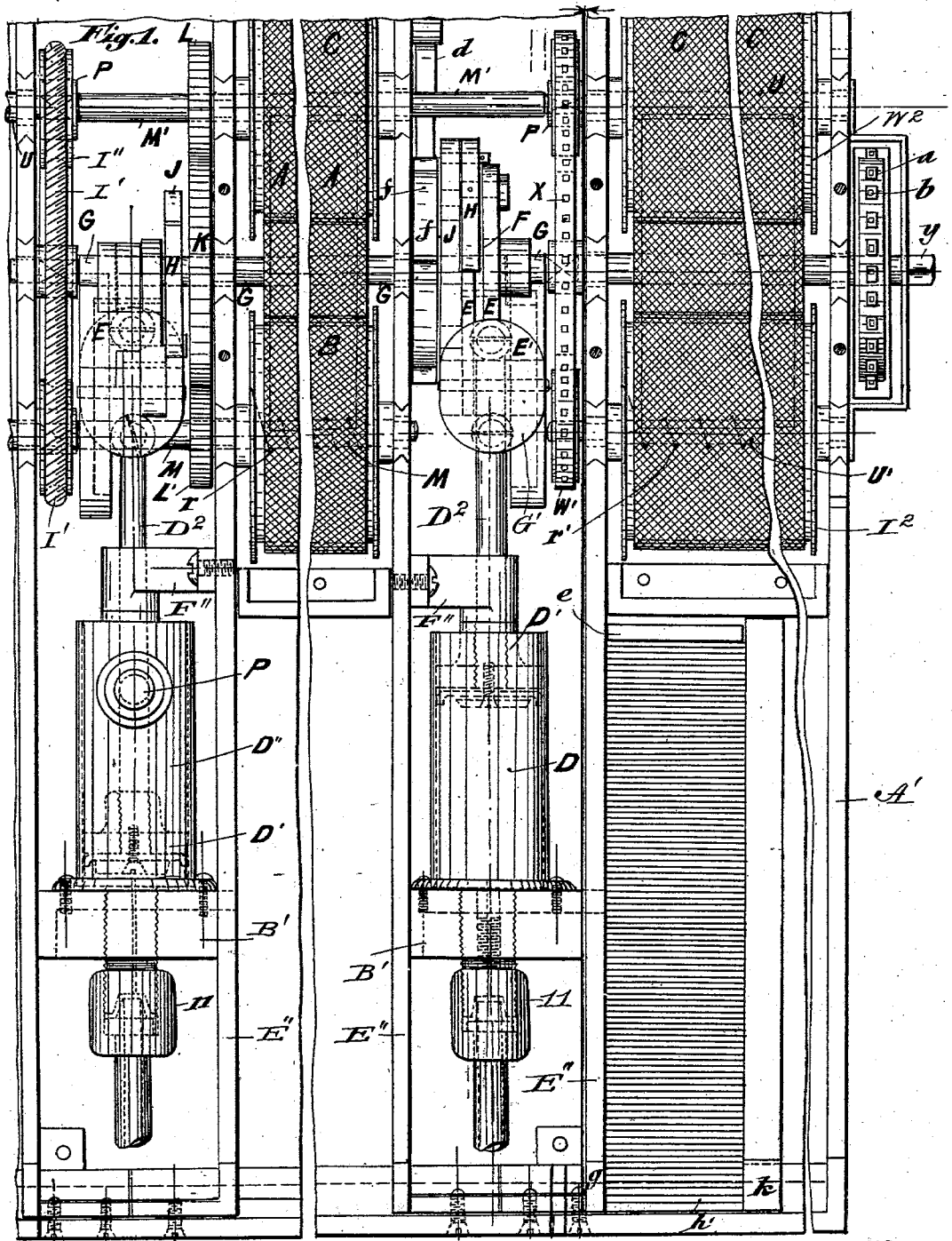

No. 661,510. Patented Nov. 13, 1900.
J. B. FONDU.
INDICATOR.
(Application filed Nov. 13, 1899.)

(No Model.) 8 Sheets—Sheet 2.

WITNESSES: INVENTOR.
Jean Baptiste Fondu,
by Gartner & Steward,
attys

No. 661,510. Patented Nov. 13, 1900.
J. B. FONDU.
INDICATOR.
(Application filed Nov. 13, 1899.)
(No Model.) 8 Sheets—Sheet 3.

WITNESSES:
Wm. D. Bell.
James B. Newton.

INVENTOR.
Jean Baptiste Fondu,
by Gartner & Steward,
Attys

No. 661,510. Patented Nov. 13, 1900.
J. B. FONDU.
INDICATOR.
(Application filed Nov. 13, 1899.)
(No Model.) 8 Sheets—Sheet 4.
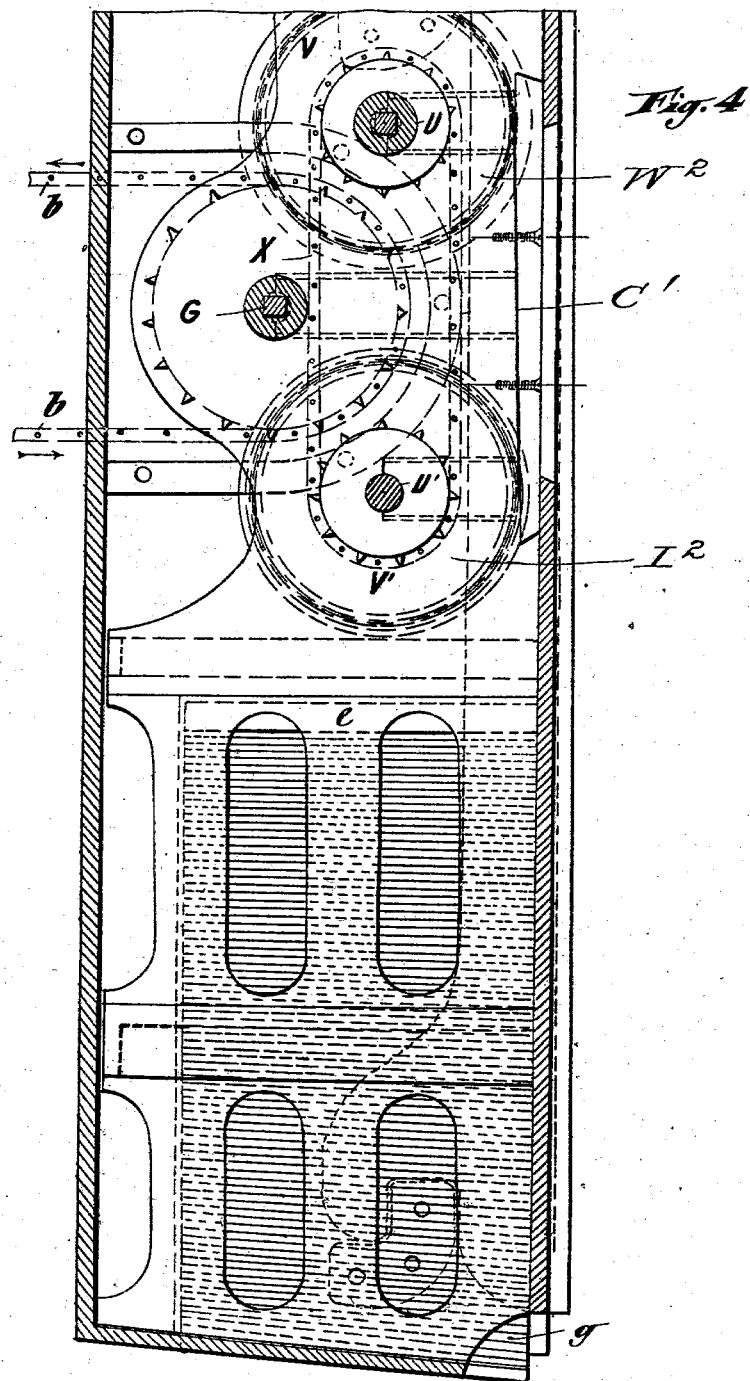

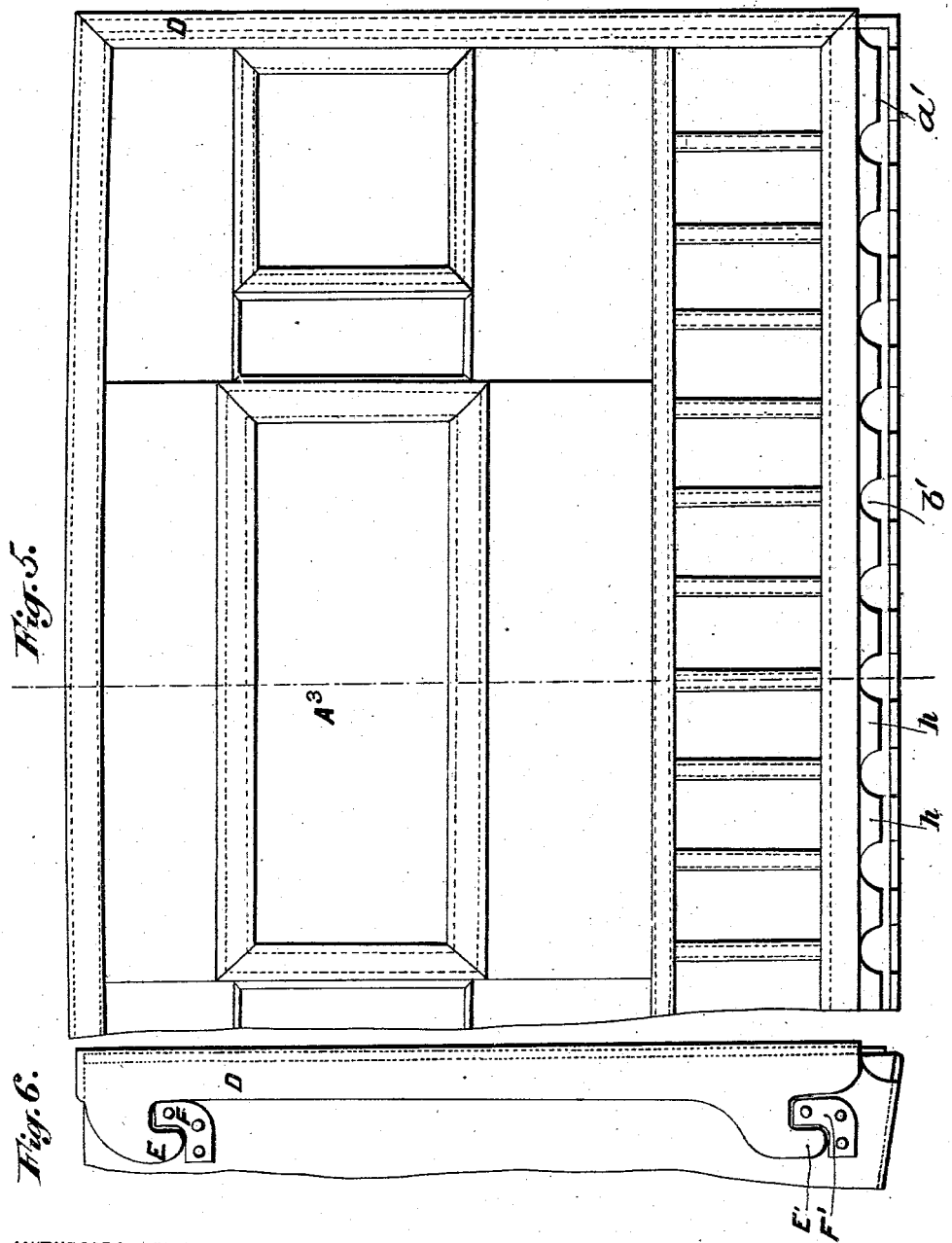

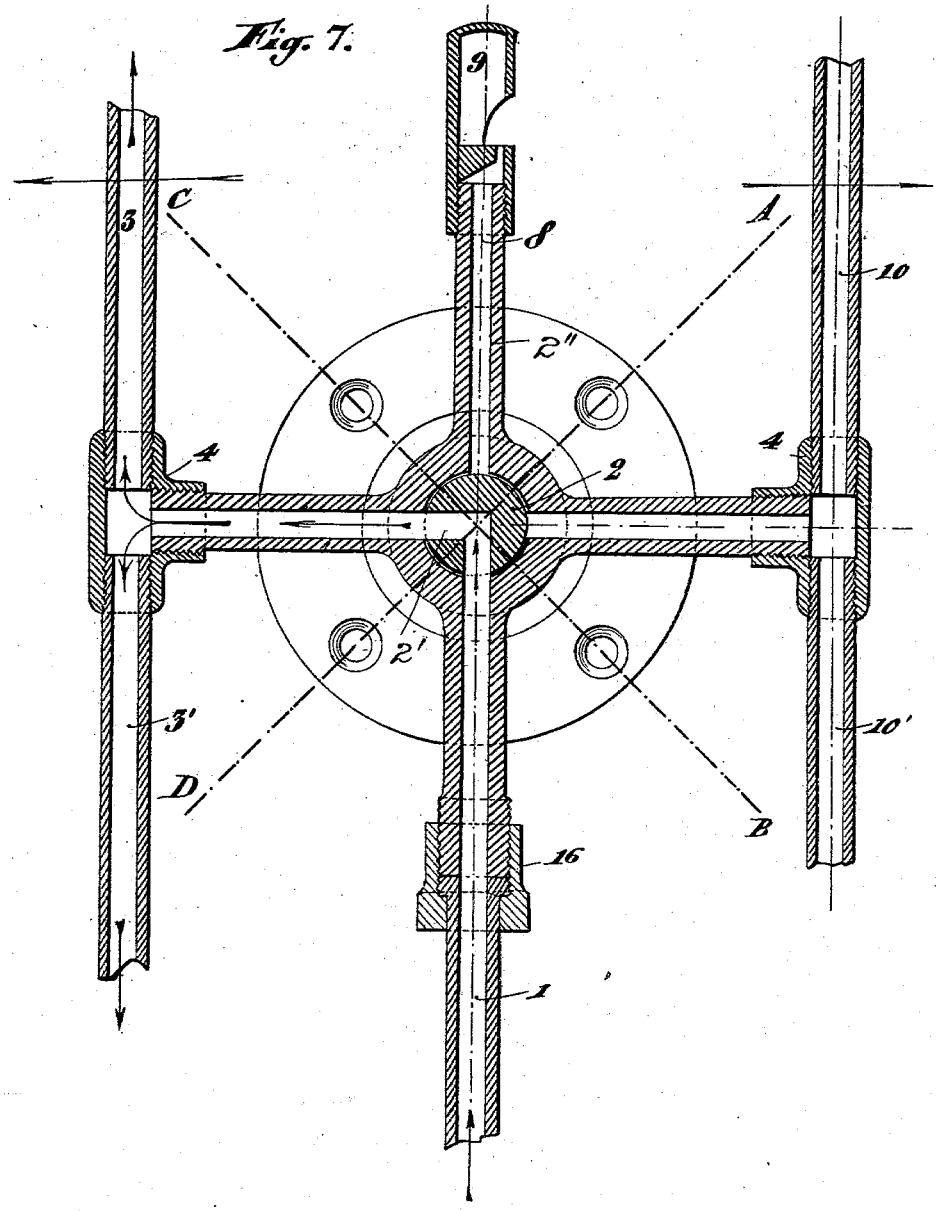

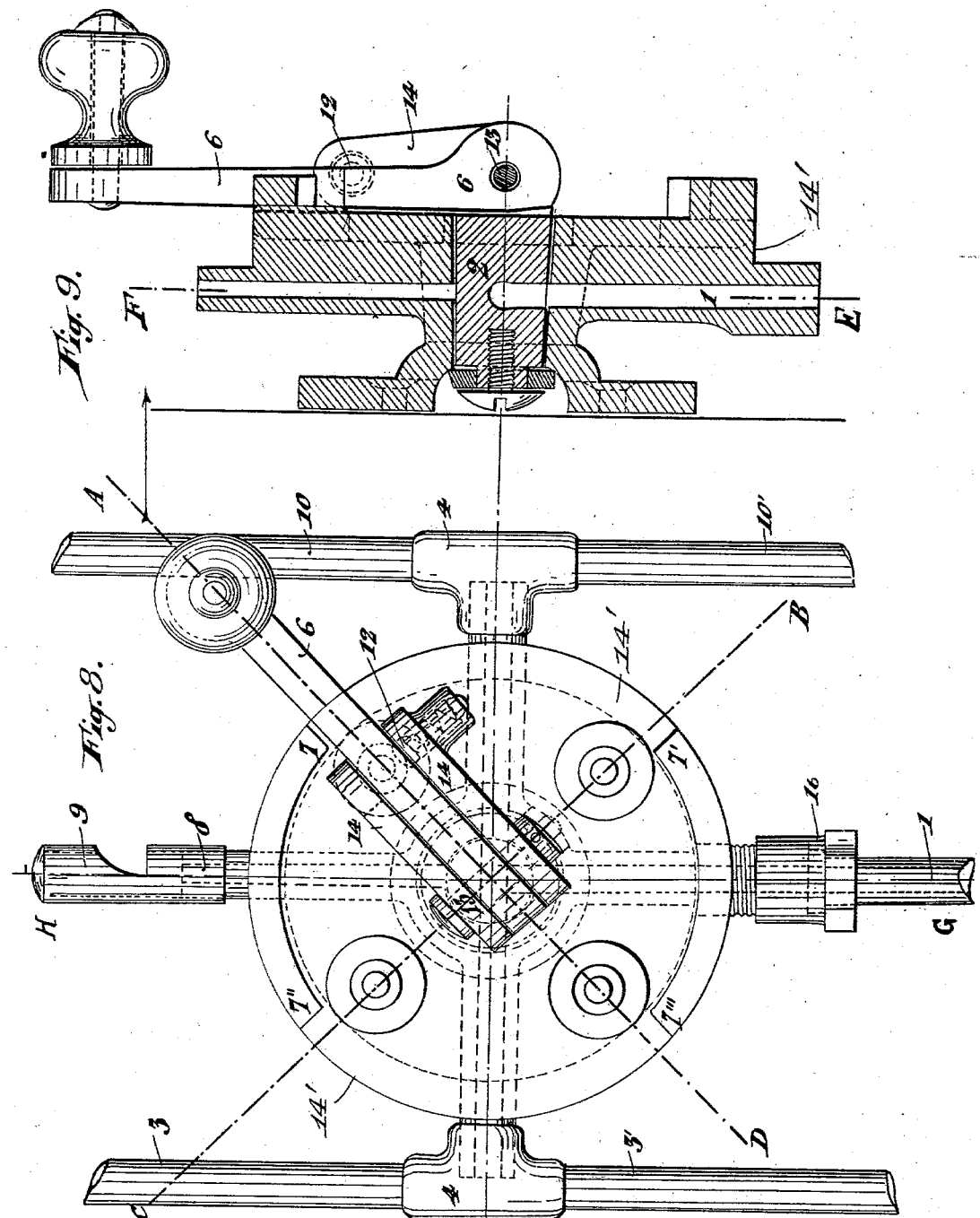

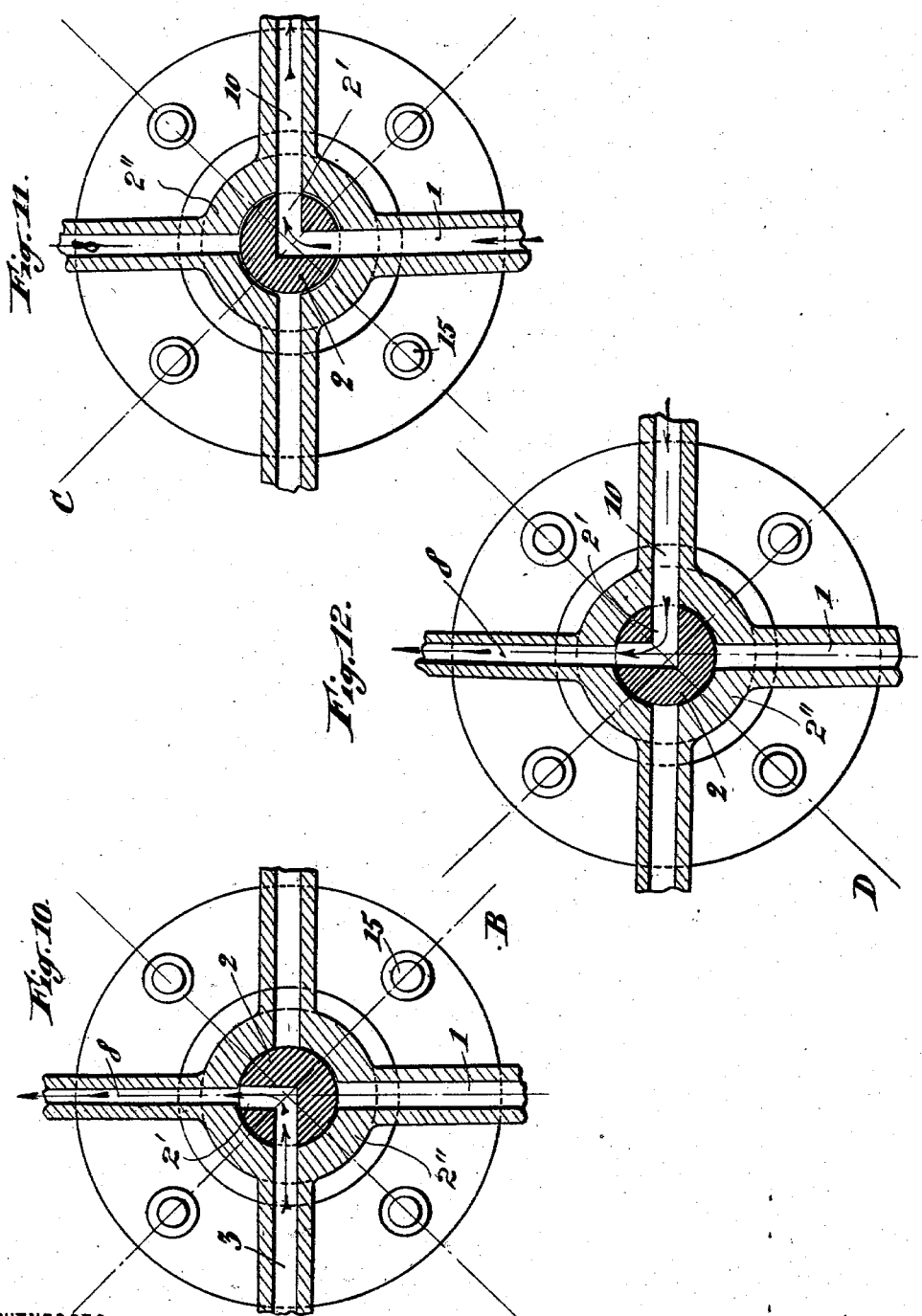

UNITED STATES PATENT OFFICE.

JEAN BAPTISTE FONDU, OF BRUSSELS, BELGIUM.

INDICATOR.

SPECIFICATION forming part of Letters Patent No. 661,510, dated November 13, 1900.

Application filed November 13, 1899. Serial No. 736,750. (No model.)

*To all whom it may concern:*

Be it known that I, JEAN BAPTISTE FONDU, a subject of the King of Belgium, residing in Brussels, Belgium, have invented certain new and useful Improvements in Indicators; and I do hereby declare the following to be a full, clear, and exact description of the invention, such as will enable others skilled in the art to which it appertains to make and use the same, reference being had to the accompanying drawings, and to reference characters marked thereon, which form a part of this specification.

This invention relates to indicating apparatus, and it has reference particularly to that kind of apparatus of this nature in which mechanism is employed for intermittently changing the inscriptions or other devices setting forth the advertising matter.

The apparatus hereinafter described as one embodiment of my invention is adaptable for use especially in railroad-trains, depots, &c., as a station-indicator or to designate the hours of departure or arrival, successively, of trains and also to display changeable advertising matter.

The invention consists in the improved indicating apparatus, in the combination therewith of a moving advertising apparatus, and in the combination and arrangement of the various parts thereof, substantially as will be hereinafter pointed out and finally embodied in the clauses of the claim.

Figure 2:
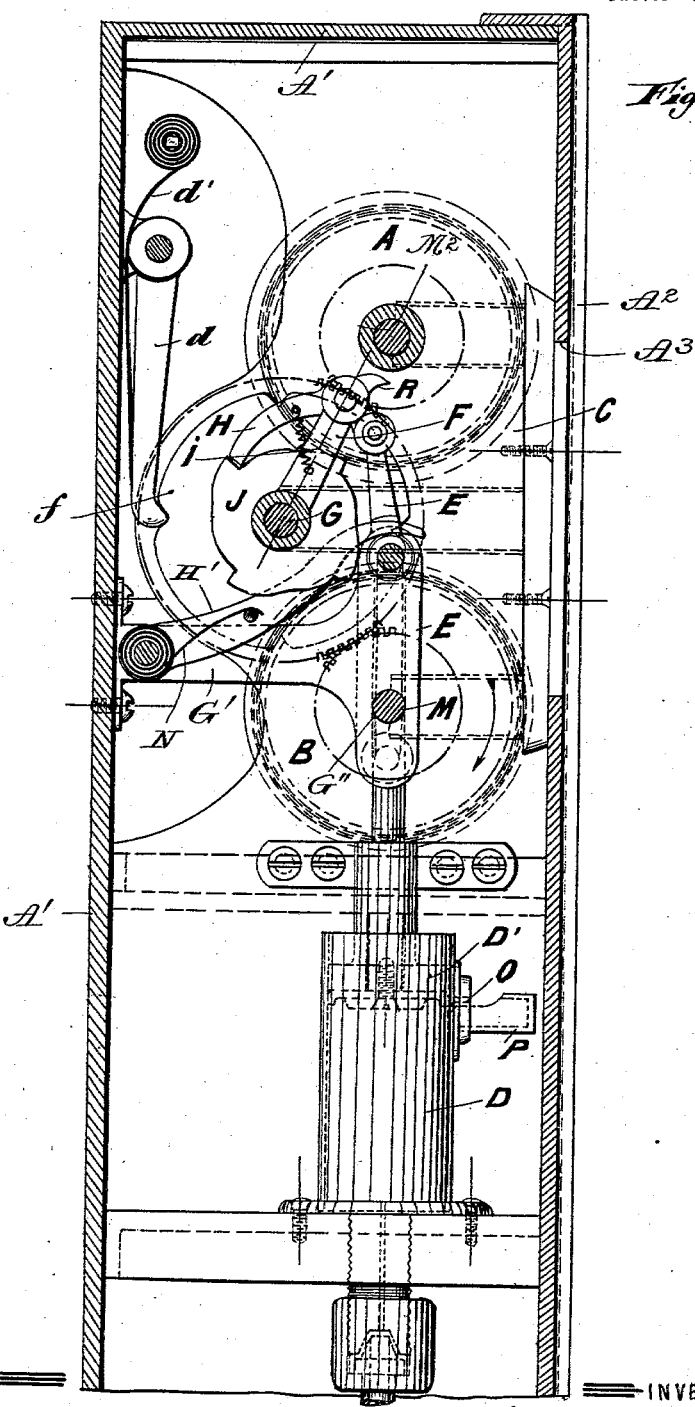
Figure 3:
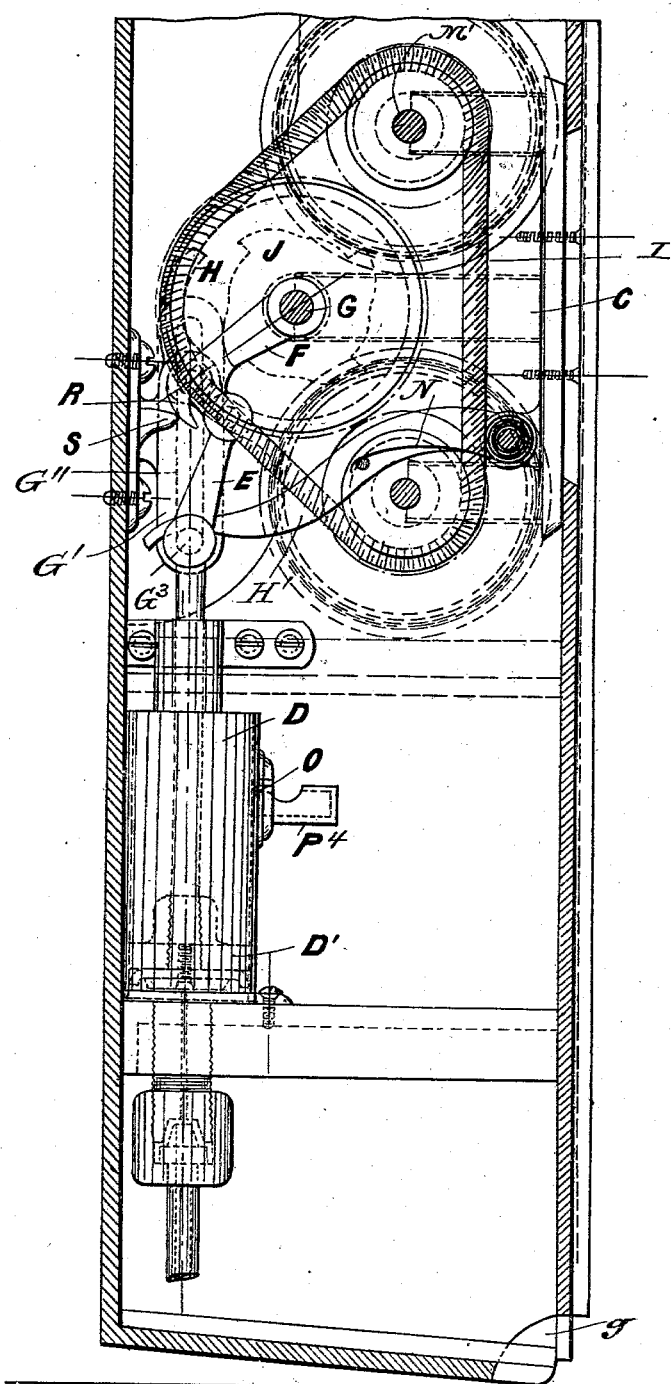

Referring to the accompanying drawings, Figure 1 is a view in front elevation of my improved indicating apparatus, the front wall of the casing thereof being removed and certain parts being broken away. Fig. 2 is a vertical sectional view of substantially what is shown in Fig. 1, the view being taken as seen from the left of Fig. 1 and in a plane to the left of a certain cylinder D. Fig. 3 is a vertical sectional view of substantially what is shown in Fig. 1, the view being taken as seen from the left of Fig. 1 and in a plane to the left of a certain cylinder D'. Fig. 4 is a vertical sectional view of that portion of the mechanism which constitutes the advertising apparatus, one such advertising apparatus being adapted to be placed at each side of the indicating apparatus, as best shown in Fig. 1. Fig. 5 is an exterior view, in front elevation, of my apparatus, a portion thereof being removed. Fig. 6 is a view in side elevation of a portion of what is shown in Fig. 1, showing the manner of securing in place the front wall of the casing. Figs. 7 to 12, inclusive, illustrate a mechanism for controlling the connection between the service-pipe of the braking system and the pipes which connect several of my apparatuses, Figs. 8 and 9 illustrating an operating-key and the other figures illustrating in section the various positions of a valve controlling the connection between the said pipes.

A' designates a substantially-rectangular casing whose front wall $A^2$ is removable, being adapted to be secured in place by interlocking clips E' F', as shown in Fig. 6. Said wall
$A^2$ has apertures $A^3$. In said casing are arranged two horizontal supports B', upon each of which rests a vertical cylinder D D", each cylinder being arranged between two vertical walls E", against one of which it is steadied
by a brace F".

$D^2$ designates the piston-rod of each cylinder, the same having secured to it a piston D', working in the cylinder. One of these cylinders is arranged near the front and the
other near the back of the casing A'. G is a
horizontal shaft which is journaled in said casing above the cylinders.

G' designates two brackets having vertical slots G", which form guides for the upper
ends of the piston-rods, the latter having pins
$G^3$, which work in said slots and to which are pivotally connected links E, said links being in turn pivotally connected to the free ends of levers F, which are loosely fulcrumed on
the shaft G.

H' denotes presser-levers which are fulcrumed in the front part of the casing, bearing upon the pins $G^3$ and being adapted, by virtue of springs N, to normally tend to force
the pistons downwardly.

On horizontal shafts M and M', disposed in the casing the one above and the other below the shaft G, are journaled rollers A B, upon which is wound a band C, bearing inscrip-
tions designed to have reference to the stations along the route over which the train passes or to indicate the times of arrival and departure of trains, the apparatus being in the latter case placed in stations.

The shafts M, G, and M' are connected by gearing K. The shaft G carries ratchets J, set relatively reversely on said shaft, each ratchet being adapted to be engaged by a spring-actuated pawl H, pivotally mounted at the free end of each lever F, the springs for said pawl being indicated by the reference character I. The pivoted end of each pawl is provided with a toe R, which when the lever J swings downwardly far enough impinges against a projection S and so throws the pawl out of engagment with the ratchet, as best shown in Fig. 3.

Through the system of mechanism above described one of the cylinders is adapted to drive the band-carrying rollers A and B in one direction, as when a train is making its outgoing trip, while the other cylinder is adapted to drive said rollers in the other direction—i. e., during the return trip of the train. In order to maintain the shaft G and the rollers A B in the positions to which they are intermittently advanced, a pawl $d$, controlled by a spiral spring $d'$ and fulcrumed upon the rear wall of the casing, is provided, its point being adapted to engage notches disposed at suitable points on the periphery of a disk $f$, which the shaft G carries. In each end wall of the casing and in the adjoining wall E'' are journaled shafts U U', respectively alined with the shafts M M' and connected by a chain X, passing over sprockets V V', carried on said shafts, as shown in Figs. 1 and 4, or by a belt I', passing around small pulleys I'', as shown at the left in Fig. 1. The parts partly shown at the left in Fig. 1, it should be remarked, are with the exception of said belt I' identical with those shown at the right in said figure. Each shaft U is coupled with the shaft M', so as to be driven thereby. Over drums $W^2$ and $I^2$, carried on the shafts U U', extends a band C', which is adapted to be wound on either drum in each pair of drums. In order to keep this band taut, the corresponding lower drums $I^2$ are loosely mounted upon their shafts, each being connected therewith by a spiral spring $r'$, coiled about the shaft and inclosed by said drums, as seen in Fig. 1. The spring $r'$ is adapted to compensate for the variations in the tension that is produced in the band C' as it winds upon the one and unwinds from the other of the drums.

Upon the bands C' are adapted to be placed various advertising matter, the same being adapted to be read through the smaller apertures $A^3$, disposed both sides of the main aperture, through which matter of indication for the main apparatus is read.

If it is desired to manually operate the mechanism, the pistons being down and the pawls H being held out of engagement with their respective ratchets by means of the projections S, a crank may be attached to the squared end of a shaft $y$, which is coupled to the shaft G and protrudes through the wall of the casing at one end. Furthermore, should it be desired to connect up several of the apparatuses, driving them in tandem, as in the case of the compartment-cars used in European countries, sprocket-wheels may be mounted upon the respective shafts $y$, being connected by chains $b$. (Shown in Fig. 4.)

In Figs. 7 to 12 I show a system of tubing whereby several of my indicating devices in service on a railroad-train are operatively connected up with a suitable fluid storage tank or reservoir, as of a Westinghouse braking apparatus, together with means for controlling the air or other fluid under pressure serving as the actuating medium. Referring to Figs. 7 to 12, inclusive, 1 designates a pipe leading from the said tank or reservoir, and 3 3' 10 10' denote two pipes, one of which is provided with suitable leaders, connecting it with corresponding cylinders of the several indicating apparatuses in the cars, and the other of which is provided with similar leaders, connecting it with the other cylinders in said indicating apparatuses. To be more specific, the leaders from one of these pipes connect with the cylinders which operate the indicators in the train on its outgoing trip, while the leaders from the other pipe connect with the cylinders for operating the indicators on the incoming trip of the train.

In the cab of the locomotive of the train or in the baggage-car is adapted to be placed a controlling-key (shown in Figs. 8 and 9) for the system. 2 is a plug operated by this key and provided with an angular duct 2', said plug being movably arranged at the intersection of the ports of a quadrangular pipe connection or cross 2''. Two opposing ports of this cross connect with the pipes 10 10' 3 3', while the other two opposing ports connect, respectively, with the pipe 1 and a whistle or other sounding device $g$. This sounding device is of course in the cab or baggage-car with the controlling-key. It should be remarked that the sections of piping 10 and 3 or 10' and 3' are plugged up, according as they happen to be adjacent the end of the car which is the farthest from the passenger-cars. The piping at the rear end of the train is also of course plugged up. Now it will be seen that by turning the plug 2 its angular port 2' can be made to effect communication between either one of the systems of piping 10 10' or 3 3' and the pipe 1, or between either of said systems of piping and the sounding device $g$.

The key is designated by the reference character 6, and it is pivotally mounted upon the upper end of the plug 2, being disposed between two arms 14 and adapted to be removably secured between said arms by a spring-gudgeon 12, mounted in one of said arms and engaging a notch in the side of the key. Upon the cross is mounted a disk 14', having stops 7 7' 7'' 7''' disposed at quadrantal intervals on said disk. The stop 7 is in the shape of a notch formed in said disk. By lifting the lever out of engagement with its gudgeon it may be released from the notch at 7 and moved from its starting-point into contact with the stop 7″, so as to connect the pipe 1 with the piping 3 3′, or by shifting the key still farther the piping 10 10′ may be connected either with the pipe 1 or with the sounding device g.

It should be remarked that each of the cylinders is provided with a whistle P⁴, arranged near the top thereof, so that when its piston passes an orifice O, leading to said piston, the air in the cylinder will escape to sound the whistle.

It will be understood, in view of what has been above described, that by simply shifting the lever the attendant can throw the several indicating apparatuses in the train into communication with the supply-reservoir, so as to operate them. Then by shifting the key back again the pressure in the piping leading to said indicating apparatuses will return, and if it has been sufficient to sound the sounding devices accompanying the several indicating apparatuses the whistle near him will be sounded, and so he will know that the several indicating apparatuses have been duly actuated.

If it is desired, the lower portion of the casing in which the mechanism is arranged may be divided up into compartments and used for the reception of cards setting forth various advertising matter, &c., as of hotel rates and accommodations, localities of hotels, and the principal places of interest in towns, &c. In Figs. 4, 5, and 6 the bottoms of the several compartments are shown as provided with slots a′, through which the tickets may be fed one by one, openings b′ for the thumb and forefinger being also provided.

Having thus fully described my invention, what I claim as new, and desire to secure by Letters Patent, is—

1. The combination, with a source of fluid-power, of a fluid-controlled apparatus operative in a forward or backward direction, a sounding device, piping connecting said source of fluid-power and said apparatus and the sounding device, said piping comprising two sections through one of which the fluid is adapted to be conveyed whereby to actuate said apparatus in one direction and through the other of which the fluid is adapted to be conveyed to actuate said apparatus in the other direction, said sounding device and the source of fluid-power having a common port of communication with each of said sections of piping, and a valve controlling said ports and adapted to maintain the closure of one and to effect, simultaneously, communication, through the other, between the corresponding section of piping and the source of fluid-supply and the closure of communication, through said port, between said section of piping and the sounding device, or vice versa, substantially as described.

2. The combination, with a source of fluid-power, of a plurality of fluid-controlled indicating apparatuses each operative in a forward or backward direction, a sounding device, a cross, two opposing ports of said cross being connected with the sounding device and the source of fluid-power, piping, said piping comprising two sections connecting the other two ports of said cross and said apparatuses and adapted the one to convey the fluid whereby to actuate said apparatuses in one direction and the other to convey the fluid whereby to actuate said apparatuses in the other direction, and a revolving valve having an angular port and arranged at the intersection of the ports of said cross, said valve being adapted to effect communication between any two adjoining ports of said cross and maintain the closure of the other ports thereof, substantially as described.

3. The combination, with a source of fluid-power, of pairs of cylinders, supports for said cylinders, shafts journaled in said supports, one shaft for each pair of cylinders, an indicating apparatus controlled by each shaft, pairs of power-transmitting mechanisms operatively connecting each shaft and the corresponding pair of cylinders and adapted to turn said shaft, the one in the one direction and the other in the other direction, a sounding device, piping connecting said source of fluid-power and the cylinders and the sounding device, said piping comprising two sections, through one of which the fluid is adapted to be conveyed whereby to actuate one of said cylinders in each pair and through the other of which the fluid is adapted to be conveyed to actuate the other of said cylinders in each pair, said sounding device and the source of fluid-power having a common port of communication with each of said sections of piping, and a valve controlling said ports and adapted to maintain the closure of one and to effect, simultaneously, communication, through the other, between the corresponding section of piping and the source of fluid-supply, and the closure of communication, through said port, between said section of piping and the sounding device, or vice versa, substantially as described.

In testimony that I claim the foregoing I have hereunto set my hand this 8th day of November, 1899.

JEAN BAPTISTE FONDU.

Witnesses:
JOHN W. STEWARD,
J. J. OTTO.